UNITED STATES PATENT OFFICE.

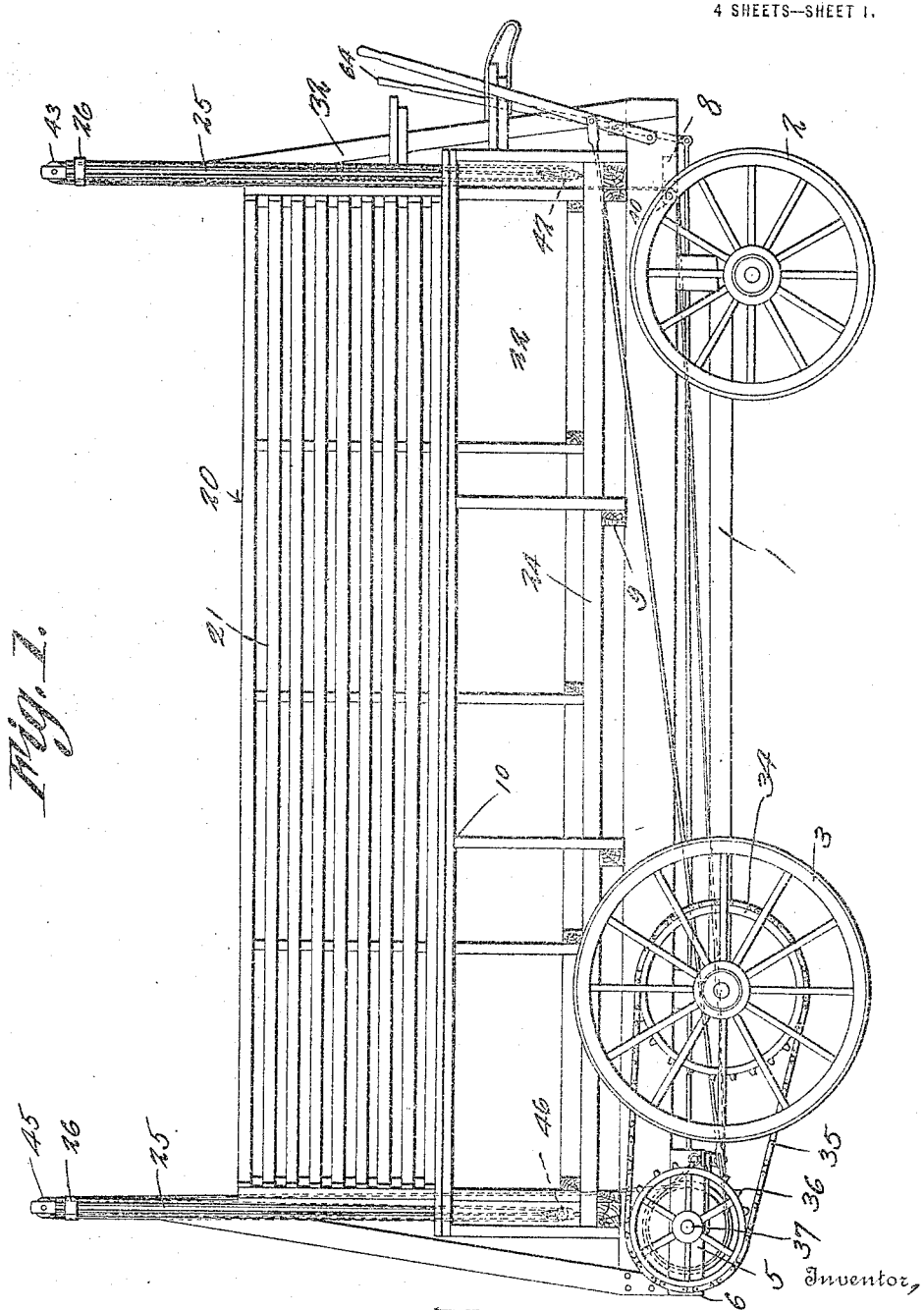

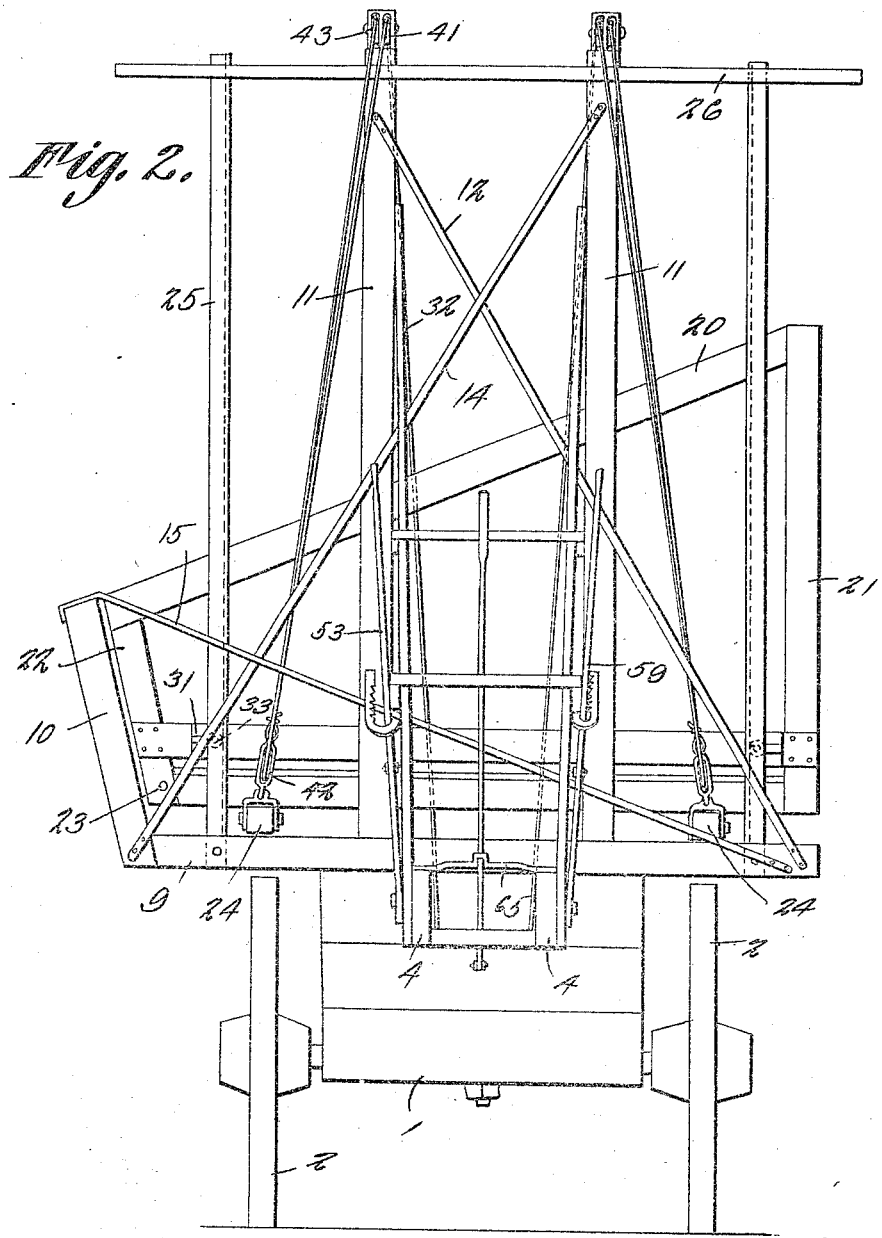

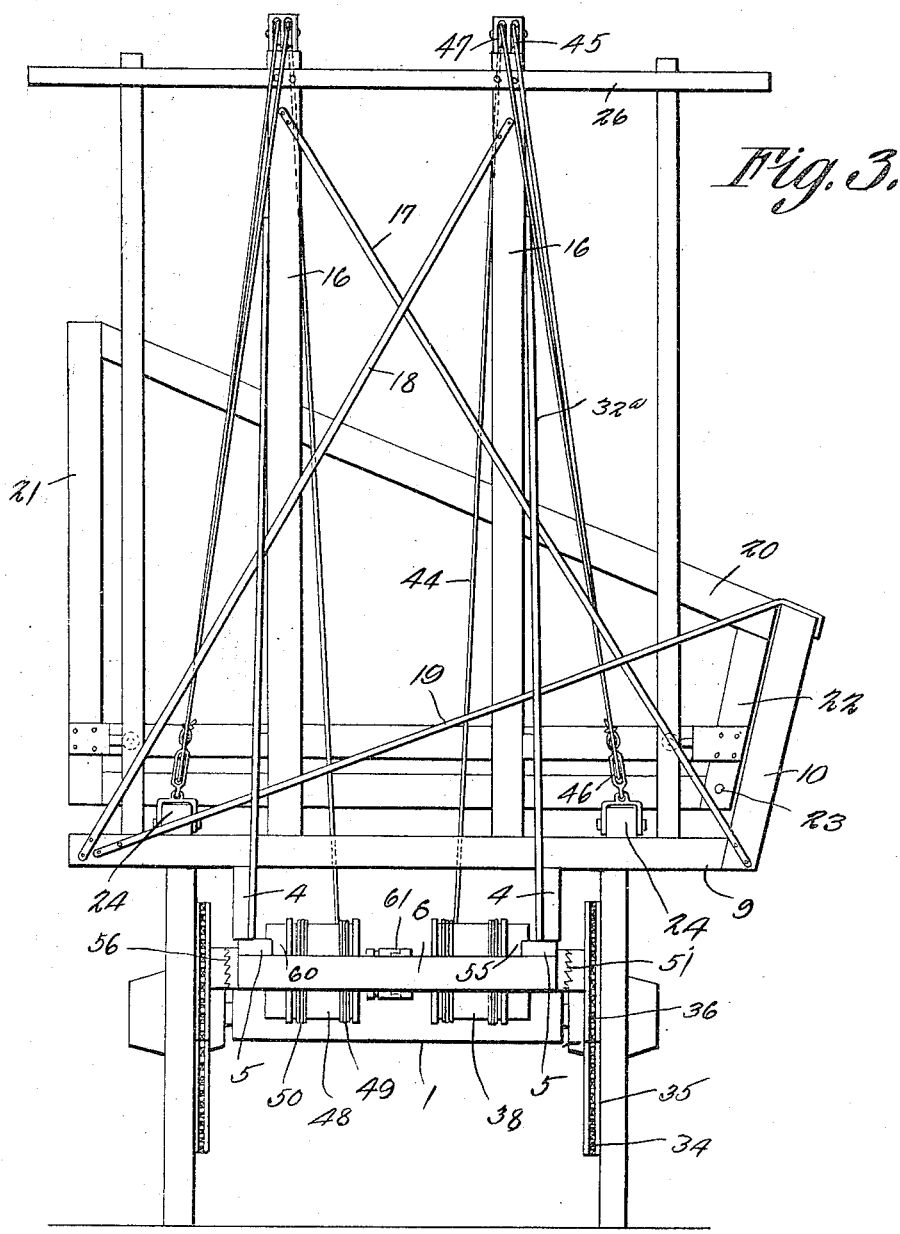

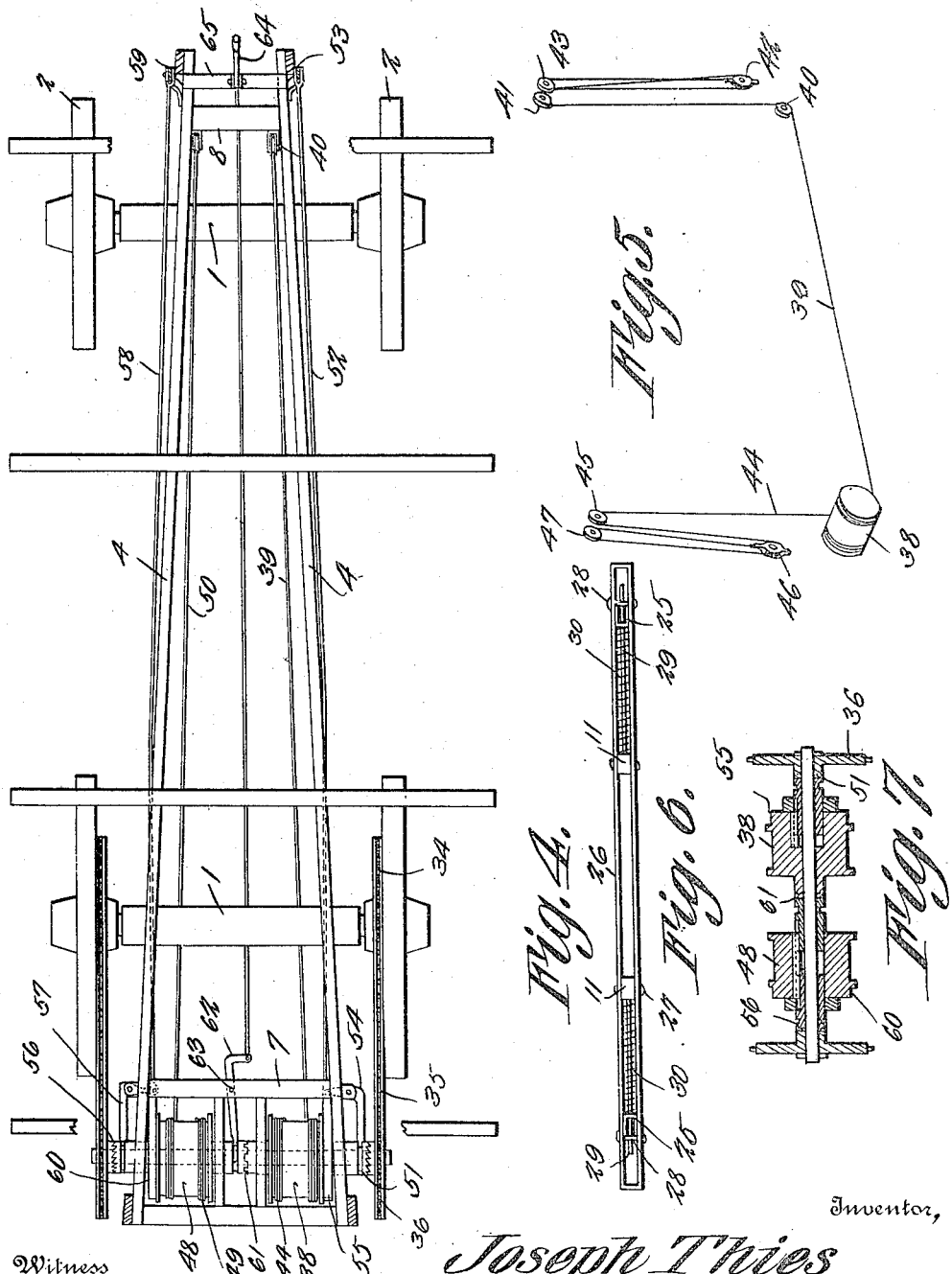

JOSEPH THIES, OF GREAT BEND, KANSAS.

HEADER-BARGE.

1,293,982.  Specification of Letters Patent.  Patented Feb. 11, 1919.

Application filed September 20, 1918. Serial No. 254,949.

*To all whom it may concern:*

Be it known that I, JOSEPH THIES, a subject of the King of Belgium, and a declarant citizen of the United States, residing at Great Bend, in the county of Barton and State of Kansas, formerly of Bovigny, Huffalize, Belgium, have invented new and useful Header-Barges, of which the following is a specification.

The device forming the subject matter of this application is adapted to be employed for receiving and dumping headed grain, and the invention aims to provide novel means whereby a cradle carrying the headed grain may be raised vertically when the vehicle which carries the cradle is advanced, means being provided whereby the cradle may be tilted to dump its load.

Within the scope of what is claimed, a mechanic can make changes, without departing from the spirit of the invention.

In the drawings:—

Figure 1 shows in side elevation, a device constructed in accordance with the invention; Fig. 2 is a front end elevation; Fig. 3 is a rear end elevation; Fig. 4 is a top plan wherein parts have been removed; Fig. 5 is a diagram showing how the hoisting cables are arranged and operated; Fig. 6 is a top plan showing one of the yokes and attendant parts; and Fig. 7 is a sectional plan showing certain of the clutches and parts wherewith the clutches coöperate.

The invention comprises a truck or vehicle 1 of any desired sort having front wheels 2 and rear wheels 3.

A main frame is mounted on the truck 1 and comprises longitudinal beams 4 provided adjacent their rear ends with supports 5. The supports 5 are connected by an end bar 6 and a cross bar 7, the beams being connected adjacent to their forward ends by a head bar 8. The main frame 1 includes a bottom 9 mounted on the beams 4, and a side 10. Front uprights 11 are connected at their lower ends to the bottom 9, one upright being supported by means of a brace 12, a brace 14 extending between the other upright 11 and the side 10, and the side 10 being connected with the bottom 9 by a brace 15. The uprights 11 may be sustained by means of braces 32 connected at their lower ends with the longitudinal beams 4. Similar rear uprights 16 are assembled with the bottom 9 and are sustained by braces 17 and 18 of the kind hereinbefore alluded to, the side 10 being supported by a brace 19 and braces 32ª connecting the uprights 16 with the rear ends of the longitudinal beams 4. Tracks 25, which may be U-shaped in cross section, are connected with the bottom 9 at each end of the main frame and are located outwardly of the uprights 16—16 and 11—11. The upper ends of the members 11—11 and 16—16 are received in yokes 26 and are secured thereto as shown at 27. The upper ends of the tracks 25 are received in the yokes 26, but are not secured thereto. The tracks 25 possess some resiliency and the outward movement of the upper ends of the tracks is limited by transverse stops 28 carried by the yokes 26. Horizontal rods or supports 29 are mounted at their inner ends on the uprights 11—11 and 16—16, the rods passing loosely through the tracks 25 near to the upper ends thereof. Compression springs 30 surround the rods 29 and abut at their ends against the uprights 11—11 and 16—16, and against the tracks, the springs serving to thrust the upper ends of the tracks 25 outwardly against the stops 28, but permitting the upper ends of the tracks 25 to have a limited inward movement, for a purpose which will be set forth hereinafter.

The invention comprises a cradle 20 having a fixed high side 21 and a low side 22 pivoted to the bottom portion of the cradle, as shown at 23, so that the said low side can swing downwardly and outwardly, the cradle comprising longitudinal beams 24. Brackets 31 are mounted on the ends of the cradle and carry rollers 33, adapted to move vertically along the tracks 25.

Sprocket wheels 34 are connected with the rear ground wheels 3 to rotate therewith, sprocket chains 35 being engaged around the sprocket wheels 34 and around sprocket wheels 36 journaled on a shaft 37 mounted in the supports 5. A drum 38 is rotatable on the shaft 37. One end of a flexible element 39 is wound around the drum 38, the flexible element 39 extending across an idler 40 on the head bar 8 and around a sheave 41 on one of the uprights 11. From the sheave 41, the flexible element 39 extends through a pulley block 42 connected to the forward end of one of the beams 24. From the pulley block 42, the flexible element 39 extends around a sheave 43 on the upper end of the said upright 11, the extremity of the flexible element being connected to the pulley block 42. A flexible element 44 is wound at one end around the drum 38 and is extended upwardly around a sheave 45 on one of the rear uprights 16. From the sheave 45, the flexible element 44 extends through the pulley block 46 and thence around a sheave 47 on the said upright 16, the extremity of the flexible element being connected to the pulley block. The construction above described is comparatively simple, but it may be stated that when the drum 38 is rotated in one direction, one side of the cradle will be raised, whereas, if the drum 38 is operated in a reverse direction, the said side of the cradle will be lowered.

A drum 48 is journaled on the shaft 37 and carries a flexible element 49, corresponding to the flexible element 44. The drum 48, carries also, a flexible element 50 corresponding to the flexible element 38. The flexible elements 49 and 50 are led to the ends of the cradle in a manner hereinbefore described and shown in Fig. 5 and it will be obvious that by rotating the drum 48 in one direction, the corresponding side of the cradle will be raised, whereas, if the drum 48 is operated in a reverse direction, the said side of the cradle will be lowered.

The drum 38 may be connected with one of the sprocket wheels 36 by means of a clutch 51 operated by a bell crank 54 pivoted to a rod 52 operated by a lever 53 fulcrumed on the front of the vehicle body, this lever, like the levers hereinafter described, being provided with any suitable latch mechanism. A brake strap 55 is connected to the rod 52 and controls the movement of the drum 38. A clutch 57 connects the drum 48 and the corresponding sprocket wheel 36 and is operated by a bell crank lever 57 which, like the bell crank lever 54, is fulcrumed on the cross bar 7. The bell crank lever 57 is operated by a rod 58 pivoted to a lever 59 fulcrumed on the forward end of the vehicle. A brake strap 60 is connected to the rod 58 and coöperates with the drum 48. A clutch mechanism 61 on the shaft 37 connects the drums 38 and 48 for simultaneous rotation, the movable member of the clutch mechanism 61 being operated by a bell crank lever 62 fulcrumed on the cross bar 7 and connected with a rod 63 pivoted to a lever 64 located at the front of the vehicle and mounted to swing on a cross plate 65 connecting the forward ends of the longitudinal beams 4.

In practical operation, the clutches 56 and 51 are manipulated so that the drums 48 and 38 are not connected with the respective sprocket wheel 36, the clutch mechanism 61 being operated to connect the drums 38 and 48. The load is placed in the cradle 20, the pivoted low side 22 of the cradle being held closed by engagement with the side 10 of the main frame. When the operator manipulates the clutches 56 and 51 to connect the drums 48 and 38 with respective sprocket wheels 36, then, motion is transmitted from the ground wheels 3 by way of the sprocket wheels 34 and the chains 35 to the sprocket wheels 36 and to the drums 38 and 48. The drums 38 and 48 are rotated, the flexible elements 44 and 39 are reeled on the drum 38, the flexible elements 49 and 50 are reeled on the drum 48, and the cradle is raised horizontally. When the cradle has been raised sufficiently, the clutches 56 and 61 are thrown out, but the drums 48 and 38 are held, respectively by the brake straps 60 and 55. The cradle thus is held in the position in which it has been raised, the bottom of the cradle being horizontally disposed, but, since the sprocket wheels 36 are no longer connected operatively with the drums 38 and 48, it is possible to advance or move backwardly the vehicle, without operating the drums, for the purpose of locating the vehicle at the point where the load is to be dumped. The clutch mechanism 61 is manipulated, setting the drums 38 and 48 free for independent rotation, the drum 48, however, being held by the brake strap 50. The brake strap 55 is eased off and the drum 38 is permitted to rotate, whereupon one side of the cradle will swing downwardly, thus inclining the bottom of the cradle and causing the cradle to dump its load, the pivotally mounted side 22 of the cradle resting in an inclined position on the upper edge of the side 10 of the main frame. After the load has been dumped, both the brake straps 50 and 55 are eased off and the cradle 20 is permitted to settle down into the position shown in Figs. 3 and 2, the pivoted side 22 of the cradle coöperating with the side 10 of the frame, as the cradle is lowered and the pivoted side 22 thus being swung to a closed position. The clutch mechanism 61 then is manipulated to couple up the drums 38 and 48. One object of the clutch mechanism 61 is to connect the drums 48 and 38 so that when the drums are manipulated to raise the cradle, the cradle will move upwardly with its bottom in a horizontal plane.

When the cradle 20 is tilted to one side, to dump its load, it is obvious that the distance between the rollers 33 on the cradle, projected on a horizontal plane, diminishes. Consequently, there must be a slight relative movement between the upper ends of the tracks 25 when the cradle is tilted laterally into dumping position.

In this connection, it may be noted, referring to Fig. 6 that the upper ends of the tracks 25 may move inwardly toward each other, against the action of the springs 30, the springs serving to restore the upper ends of the tracks 25 to abutting relation with respect to the stops 28, when the cradle is in a horizontal position.

Having thus described the invention, what is claimed is:—

1. In a device of the class described, a vehicle having ground wheels at its opposite sides; a cradle mounted to move vertically with respect to the vehicle; connections between the respective ground wheels and the respective sides of the cradle whereby the cradle will be raised when the vehicle is moved; and means for rendering one connection inactive, to permit a lowering of one side of the cradle.

2. In a device of the class described, a vehicle having ground wheels at its opposite sides; a cradle mounted to move vertically with respect to the vehicle; connections between the respective ground wheels and the respective sides of the cradle, each connection including a rotatable element; clutches interposed in the connections; and brakes engaging the rotatable elements.

3. In a device of the class described, a vehicle having ground wheels at its opposite sides; a cradle mounted to move vertically with respect to the vehicle; connections between the respective ground wheels and the respective sides of the cradle, each connection including a rotatable element; clutches interposed in the connections; brakes engaging the rotatable elements; and a clutch mechanism forming an operative connection between the rotatable elements.

4. In a device of the class described, a vehicle including ground wheels; a frame on the vehicle; a cradle movable vertically with respect to the frame; drums journaled on the frame; means for connecting each drum with one ground wheel; clutches interposed in said means; flexible elements assembled with the drums and with opposite portions of the cradle and constituting means for elevating the cradle; and a brake mechanism controlling the drums.

5. In a device of the class described, a vehicle including ground wheels; a frame on the vehicle; a cradle movable vertically with respect to the frame; drums journaled on the frame; means for connecting each drum with one of the ground wheels; clutches interposed in said means; flexible elements assembled with the drums and with opposite portions of the cradle and traversing the frame, the flexible elements constituting means for raising the cradle; brake mechanisms coöperating with the drums; and a clutch forming a releasable connection between the drums.

6. In a device of the class described, a vehicle; a frame on the vehicle; ground wheels constituting a part of the vehicle; a shaft carried by the frame; first sprocket wheels mounted to move with the ground wheels; second sprocket wheels journaled on the shaft; sprocket chains connecting the first and second sprocket wheels; drums journaled on the shaft; clutches connecting the drums with the second sprocket wheels; a clutch mounted on the shaft and forming an operative connection between the drums; a cradle mounted to move vertically with respect to the frame; and flexible elements assembled with the drums and the cradle, the flexible elements being trained across the frame, and constituting means for raising the cradle.

7. In a device of the class described, a vehicle comprising a frame including upright tracks; a vertically movable cradle having means for engaging the tracks slidably, the cradle being tiltable to one side; ground wheels carry the vehicle; operative connections between the ground wheels and the cradle for raising the cradle and tilting it; and a yieldable connection between the upper ends of the tracks, permitting the tracks to yield when the cradle is tilted.

8. In a device of the class described, a vehicle including ground wheels; upright tracks on the vehicle; a cradle mounted to move vertically and to tilt, the cradle having means for engaging the tracks slidably; operative connections between the ground wheels and the cradle for raising the cradle and tilting the cradle; a yoke supported on the vehicle and receiving the tracks; stops carried by the yoke and engaging the tracks to limit the movement of the tracks in one direction; and spring means on the yoke and engaging the tracks to limit the movement of the tracks in an opposite direction, when the cradle tilts.

In testimony that I claim the foregoing as my own, I have hereto affixed my signature in the presence of two witnesses.

JOSEPH THIES.

Witnesses:
JOSEPH F. MAKER,
THOMAS P. BROWN.

Copies of this patent may be obtained for five cents each, by addressing the "Commissioner of Patents, Washington, D. C."